(12) United States Patent
Martynov et al.

(10) Patent No.: US 9,694,335 B2
(45) Date of Patent: Jul. 4, 2017

(54) MASS TRANSFER APPARATUS

(71) Applicant: JOINT STOCK COMPANY "AKME-ENGINEERING", Moscow (RU)

(72) Inventors: Petr Nikiforovich Martynov, Obninsk (RU); Radomir Shamilievich Askhadullin, Obninsk (RU); Andrey Alekseevich Simakov, Obninsk (RU); Aleksandr Urievich Legkikh, Obninsk (RU)

(73) Assignee: JOINT STOCK COMPANY "AKME-ENGINEERING", Moscow (RU)

(*) Notice: Subject to any disclaimer, the term of this patent is extended or adjusted under 35 U.S.C. 154(b) by 0 days.

(21) Appl. No.: 14/914,038

(22) PCT Filed: Apr. 18, 2014

(86) PCT No.: PCT/RU2014/000282
§ 371 (c)(1),
(2) Date: Feb. 24, 2016

(87) PCT Pub. No.: WO2015/030625
PCT Pub. Date: Mar. 5, 2015

(65) Prior Publication Data
US 2016/0207019 A1 Jul. 21, 2016

(30) Foreign Application Priority Data
Aug. 26, 2013 (RU) .................. 2013139258

(51) Int. Cl.
*B01J 8/02* (2006.01)
*B01J 8/00* (2006.01)
(Continued)

(52) U.S. Cl.
CPC .............. *B01J 8/0285* (2013.01); *B01J 8/008* (2013.01); *B01J 8/0015* (2013.01); *G21C 19/02* (2013.01);
(Continued)

(58) Field of Classification Search
CPC ........ B01J 8/0015; B01J 8/008; B01J 8/0285; B01J 2208/00415; B01J 2208/00752; B01J 2208/0061; B01J 2208/065
See application file for complete search history.

(56) References Cited

U.S. PATENT DOCUMENTS 8,153,840 B2  4/2012  Woodruff et al.

FOREIGN PATENT DOCUMENTS

RU  2246561  2/2005
RU  2481140  5/2013

OTHER PUBLICATIONS

Machine Translation of the reference RU 2 246 561, cited in the IDS dated Jun. 11, 2016.*

* cited by examiner

*Primary Examiner* — Lessanework Seifu
(74) *Attorney, Agent, or Firm* — Preston Smirman; Smirman IP Law, PLLC

(57) ABSTRACT

The invention relates to energy mechanical engineering and can be used in power installations involving a liquid-metal heat carrier. A mass transfer apparatus including a housing and, provided therein, a flow reaction chamber filled with a solid-phase granulated oxidation agent, and an electric heater positioned in the reaction chamber. The housing of the apparatus is equipped with a repository for reserves of the solid-state granulated oxidation agent, said repository being located below the reaction chamber and being made in the form of a cup having a bottom, said cup being connected to the re-action chamber. The technical result consists in (Continued)

extending the operational duration of the mass transfer apparatus.

19 Claims, 1 Drawing Sheet

(51) Int. Cl.
    *G21C 19/02*     (2006.01)
    *G21C 15/00*     (2006.01)
    *G21C 1/02*     (2006.01)

(52) U.S. Cl.
    CPC .................. *B01J 2208/00415* (2013.01); *B01J 2208/00752* (2013.01); *B01J 2208/00761* (2013.01); *B01J 2208/065* (2013.01); *G21C 1/02* (2013.01); *G21C 15/00* (2013.01)

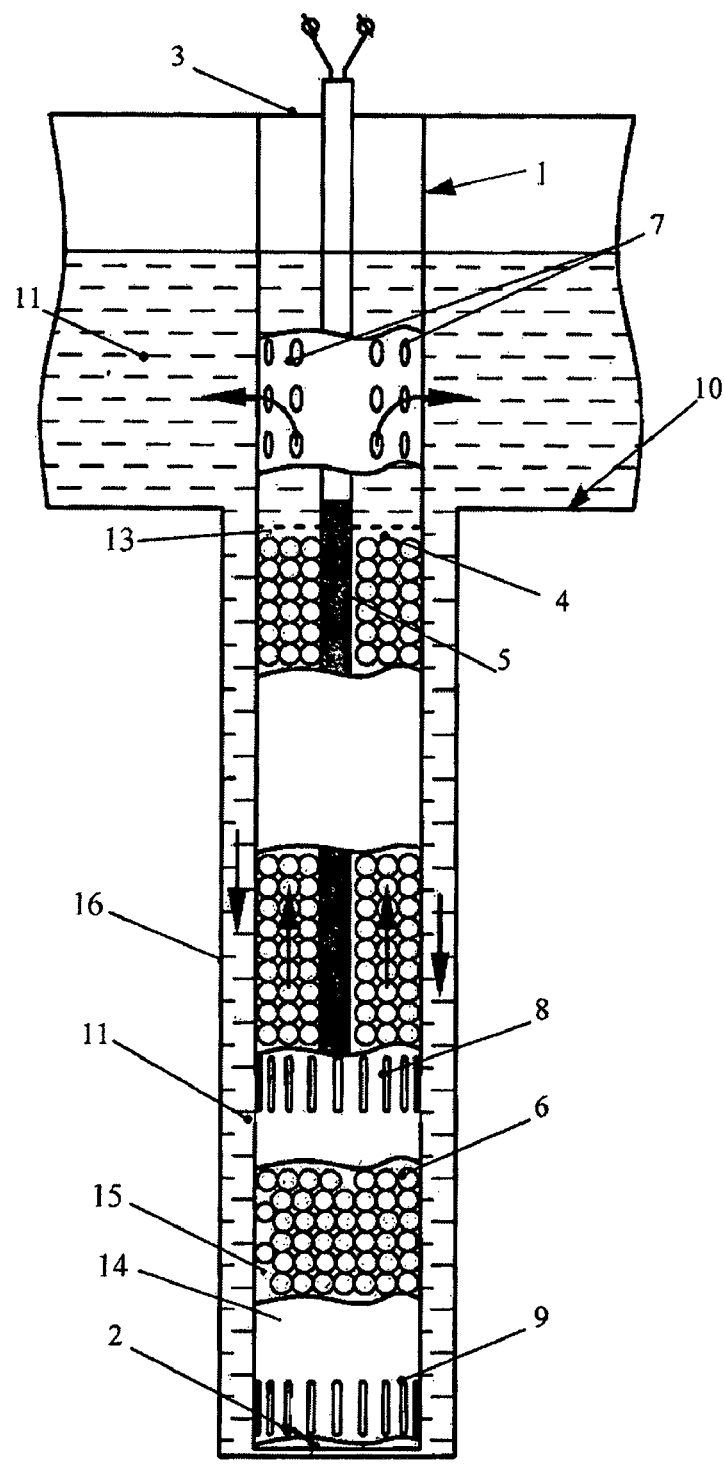

MASS TRANSFER APPARATUS

CROSS-REFERENCE TO RELATED APPLICATION

The instant application is a national phase of PCT International Application No. PCT/RU2014/000282 filed Apr. 18, 2014, and claims priority to Russian Patent Application Serial No. 2013139258, filed Aug. 26, 2013, the entire specifications of both of which are expressly incorporated herein by reference.

FIELD OF THE INVENTION

A mass transfer apparatus relates to a field of energy mechanical engineering and can be used in power installations involving a liquid-metal heat carrier containing lead.

BACKGROUND OF THE INVENTION

The closest analogue to the claimed technical solution is a mass transfer apparatus according to RF Patent No. 2246561, C23F 11/00, 20.02.2005], comprising a housing and, provided therein, a flow reaction chamber filled with a solid-phase granulated oxidation agent, an electric heater positioned in the reaction chamber, a perforated grille for removal of enriched liquid-metal heat carrier, located above the reaction chamber, used for removal of oxygen-enriched liquid-metal heat carrier, a perforated grille for supplying liquid-metal heat carrier to the reaction chamber. Return line is made in the form of a ring channel. The housing is arranged inside a cylindrical shell ring having openings for heat carrier passage, and forms a ring channel in conjunction with it, the lower end of the cylindrical shell ring is blinded off, and its upper end is partially covered, in plain view, with a ring-shaped deflector screen.

The disadvantages of the device known in the art device lie in the limited time of operation determined by reserves of the solid-state oxidation agent. Increasing the operational life by increasing the volume and load of the reaction chamber will lead to an increase in electrical energy consumption, since along with increasing the volume of the reaction chamber, the dimensions and power of the heater need to be increased, too. In addition, there are problems related to maintenance of the mass transfer apparatus, since, during extraction of the apparatus for reloading of the reaction chamber, the liquid-metal heat carrier, the filling apparatus and the cylindrical shell ring are extracted at the same time.

DISCLOSURE OF THE INVENTION

The object of the invention is to create a mass transfer apparatus, ensuring a substantial increase of operational life during a single-shot loading of a solid-state granulated oxidation agent without increasing the electrical energy consumption when operating in a liquid-metal heat carrier enrichment mode. Another object of the invention is to create a mass transfer apparatus, during the extraction of which, a minimal amount of liquid-metal heat carrier is extracted. In order to achieve the set objects, a mass transfer device is provided as described below.

The advantageous effect consists in increasing the operational life and the service life of a mass transfer apparatus, decreasing the electrical energy consumption, ensuring a possibility of its arrangement in limited space conditions, ensuring an automatic supply of a fresh oxidation agent, and ensuring the removal of a liquid-metal heat carrier from the apparatus during its extraction.

The aforementioned advantageous effects are influenced by the following essential features of the mass transfer apparatus.

The mass transfer apparatus comprises a housing and, provided therein, a flow reaction chamber filled with a oxidation agent, provided with an adjustable heating system, and systems for inlet and outlet of oxidizable material, wherein the housing of the apparatus is equipped with a repository for reserves of the oxidation agent.

In addition, in the mass transfer apparatus, in the capacity of the adjustable heating system, an electric heater, particularly a rod-type electric heater, is used, and in the electric heater, in the capacity of the heating element, a high-resistance wire made of nichrome or fechral is used.

In addition, a repository for reserves of the oxidation agent consists of a bottom and a side wall formed by the lower part of the housing, and in the upper part of the side wall of the repository for reserves of the oxidation agent, adjacent to the reaction chamber, there are openings made. Moreover, in the lower part of the side wall of the repository for reserves of the oxidation agent, there are openings made.

In addition, the repository for reserves of the oxidation agent is located below the reaction chamber and below the lower end of the electric heater. Moreover, in the initial state, the volume of the repository for reserves of the oxidation agent is filled with the oxidation agent.

In addition, the flow reaction chamber is formed by the middle part of the housing, defined from below by the upper part of the repository for reserves of the oxidation agent, and from above—by the restrictive grille, and in the restrictive grille, there are openings made.

In addition, the system for inlet of the oxidizable material is formed by the upper part of the side wall of the repository of reserves of the oxidation agent.

In addition, the system for outlet of the oxidizable material is formed by the restrictive grille of the reaction chamber and the openings in the wall of the housing of the mass transfer apparatus, and is located above the reaction chamber.

In addition, the oxidation agent is made as a solid-phase one and consisting of separate particles. Moreover, in the capacity of the solid-phase oxidation agent, a granulated lead oxide is used.

In addition, all of the openings, except for the openings in the wall of the housing of the mass transfer apparatus, forming the system for outlet of the oxidizable material, are made in the form of a series of slits having a width lesser than the size of the particles of the solid-phase oxidation agent.

In addition, the mass transfer apparatus is arranged horizontally in the oxidation agent reservoir.

Equipping the mass transfer apparatus with the repository for reserves of the solid-phase oxidation agent ensures the increase in the apparatus service life, since, as the particles loaded in the reaction chamber outflow, the feeding of the reaction chamber with the particles of the oxidation agents is ensured. However, the consumption of the electrical energy does not increase, since the volume of the reaction chamber and the dimensions of the heater have not changed.

Presence of the openings in the lower part of the repository for reserves of the oxidation agent ensures the removal of the oxidizable material (liquid-metal heat carrier) from the apparatus during its extraction.

The lead oxide has a density lower than the density of pure lead, and the granules of the lead oxide enter the reaction chamber under the action of the buoyancy force, which ensures automatic supply of fresh oxidation agent until the granules of the lead oxide outflow completely. The recovered lead is carried away by the flow of liquid-metal heat carrier.

BRIEF DESCRIPTION OF THE DRAWINGS

FIG. 1 shows the schematic layout of the mass transfer apparatus.

EMBODIMENTS OF THE INVENTION

In the FIGURE, the following conventional symbols are adopted: 1—housing; 2—bottom; 3—cover; 4—perforated grille; 5—electric heater; 6—solid-phase granulated oxidation agent; 7—outlet openings; 8—inlet openings; 9—openings (drainage); 10—volume with the heat carrier; 11—heat carrier, 13—flow reaction chamber, 14—bottom part of the repository for reserves of the oxidation agent (cup) 15—repository for reserves of the solid-phase granulated oxidation agent, 16—pocket for the housing of the mass transfer apparatus.

The mass transfer apparatus includes a reservoir formed by the housing 1, defined by the bottom 2 and a ring-shaped cover 3. In the reservoir, a flow reaction chamber 13 located inside the reservoir below the level of the liquid-metal heat carrier and defined from above by the perforated grille 4, is arranged. The restrictive grille 4 is intended for restraining the solid-phase granulated oxidation agent 6 from floating up under the action of the buoyancy force. Through the restrictive grille 4 and the openings 7 in the wall of the housing 1, located in the upper part of the wall of the housing 1 above the restrictive grille 4, the oxygen-enriched liquid-metal heat carrier leaves the mass transfer apparatus and mixes with the heat carrier of the main circuit of the installation.

The solid-phase oxidation agent 6, housed below the grille 4, when interacting with the liquid-metal heat carrier, is dissolved enriching the heat carrier with oxygen.

The heater 5, located in the reaction chamber 13 and passing through the perforated grille 4, is intended to heat the heat carrier in the reaction chamber 13.

The inlet openings 8 are located in the wall of the housing 1 at the level of the lower end of the electric heater 5, so that during operation of the mass transfer apparatus, the liquid-metal heat carrier moves substantially through the layer of the solid-phase oxidation agent, located in the reaction chamber 13 in the gap between the housing 1 and the electric heater 5.

Below the reaction chamber, the housing 1 is made in the form of a cup 14 having a bottom 2, in which the repository 15 for reserves of the solid-phase granulated oxidation agent 6 is located.

The drainage openings 9 located in the lower part of the reservoir, are intended for draining the liquid-metal heat carrier during extraction of the mass transfer apparatus from the installation.

The outlet openings 7, the inlet openings 8, the drainage openings 9 and the perforation holes in the grille 4 are made, preferably, in the form of narrow slits having a size lesser than the granules of the solid-phase oxidation agent.

When in operating position, the mass transfer apparatus is immersed into the lead-containing heat carrier, so that the outlet openings 7 are located below the level of the liquid-metal heat carrier. The mass transfer apparatus is arranged in the reservoir of the installation, wherethrough the liquid-metal heat carrier flows. If the height of the layer of the liquid-metal heat carrier is insufficient for immersing the housing of the mass transfer apparatus thereinto, the reservoir is equipped with the pocket 16, into which the housing 1 of the mass transfer apparatus is embedded. The flow of the liquid-metal heat carrier through the pocket 16 is ensured as a result of a convective flow of the liquid-metal heat carrier through the reaction chamber during operation of the electric heater 5.

The mass transfer apparatus operates as follows. Upon switching of the electric heater 5, due to the natural convection, an outflow of the liquid-metal heat carrier through the granulated solid-phase oxidation agent 6, located in the flow reaction chamber 13 in the gap between the housing 1 and the electric heater 5, is created. The liquid-metal heat carrier 11 from the ambient volume enters the mass transfer apparatus through the inlet openings 8 and moves bottom-upwards through the granulated solid-phase oxidation agent 6 located in the reaction chamber 13. The granules of the solid-phase oxidation agent, when interacting with the heat carrier, are dissolved therein enriching the liquid-metal heat carrier with oxygen. The oxygen-enriched liquid-metal heat carrier leaves the mass transfer apparatus through the outlet openings 7, and mixes with the liquid-metal heat carrier of the main circuit of the installation. The value of throughput, i.e. the amount of oxygen inflowing from the mass transfer apparatus per unit of time, is adjusted by altering the power level of the electric heater. During operation of the mass transfer apparatus, there is practically no outflow of the liquid-metal heat carrier through the reserves of the solid-phase oxidation agent, located in the repository 15 positioned in the cup 14 in the lower part of the housing 1 between the bottom 2 and the reaction chamber. In the process of operation, first the layer of the granulated solid-phase oxidation agent, located in the reaction chamber 13 in the gap between the housing 1 of the mass transfer apparatus and the electric heater 5, wherethrough the outflow of the heat carrier is ensured, begins to run out. Moreover, this layer is under elevated temperature, which facilitates the dissolution of the solid-phase oxidation agent. Since the density of the solid-phase oxidation agent (lead oxide) is lower than the density of the liquid-metal heat carrier, as the above-said layer runs out, the reserves of the solid-phase oxidation agent, located in the repository 15, when floating up, fill the freed up space in the reaction chamber 13 between the housing of the mass transfer apparatus and the electric heater.

Specific exemplary embodiment of the mass transfer apparatus.

Design characteristics of the mass transfer apparatus and the materials used:

- housing 1: inner diameter—64 mm, height—1500 mm, size of the inlet and drainage openings—2 mm, size of the outlet openings—10 mm, material—stainless steel 12H18N10T;
- perforated grille 4: size of perforation holes—2 mm, material—stainless steel 12H18N10T;
- electric heater 5: type—electric rod heater having a power capacity of 7 kW, height of the heating part—820 mm, heater housing dia. 25 mm, heating element—nichrome wire (H20N80) dia. 1.6 mm;
- solid-phase oxidation agent 6: pebble fill consisting of granules dia. 8-9 mm, material—lead oxide (PbO) of a "Ch" grade, TU 6-09-5382-88.
- Lead-containing liquid-metal heat carrier: Pb—Bi alloy, temperature—340° C.

Oxygen throughput (at an inlet temperature of 340° C.): ~1 g[O]/h.

The invention claimed is:

1. A mass transfer apparatus, comprising:
a housing and, provided therein, a flow reaction chamber filled with an oxidation agent, provided with an adjustable heating system, and systems for inlet and outlet of oxidizable material, wherein the housing is equipped with a repository for reserves of the oxidation agent.

2. The mass transfer apparatus according to claim 1, wherein an electric heater is used as an adjustable heating system.

3. The mass transfer apparatus according to claim 2, wherein a high resistance wire made of nichrome or fechral is used as a heating element.

4. The mass transfer apparatus according to claim 1, wherein the repository for reserves of the oxidation agent includes a bottom and a side wall, formed by a lower part of the housing.

5. The mass transfer apparatus according to claim 4, wherein openings are made in an upper part of the side wall of the repository for reserves of the oxidation agent, adjacent to the flow reaction chamber.

6. The mass transfer apparatus according to claim 4, wherein openings are made in a lower part of the side wall of the repository for reserves of the oxidation agent.

7. The mass transfer apparatus according to claim 1, wherein the repository for reserves of the oxidation agent is located below the flow reaction chamber.

8. The mass transfer apparatus according to claim 2, wherein the repository for reserves of the oxidation agent is located below a lower end of the electric heater.

9. The mass transfer apparatus according to claim 2, wherein, in an initial state, a volume of the repository for reserves of the oxidation agent is filled with the oxidation agent.

10. The mass transfer apparatus according to claim 1, wherein the flow reaction chamber is formed by a middle part of the housing, defined from below by an upper part of the repository for reserves of the oxidation agent, and from above, by a restrictive grille.

11. The mass transfer apparatus according to claim 10, wherein in the restrictive grille, there are openings provided.

12. The mass transfer apparatus according to claim 2, wherein the system for inlet of the oxidizable material is formed by an upper part of a side wall of the repository for reserves of the oxidation agent.

13. The mass transfer apparatus according to claim 1, wherein the system for outlet of the oxidizable material is formed by a restrictive grille of the flow reaction chamber and openings in a wall of the housing.

14. The mass transfer apparatus according to claim 13, wherein the system for outlet of the oxidizable material is located below the flow reaction chamber.

15. The mass transfer apparatus according to claim 1, wherein the oxidation agent is comprised of a solid-phase agent.

16. The mass transfer apparatus according to claim 1, wherein the produced oxidation agent is comprised of separate particles.

17. The mass transfer apparatus according to claim 1, wherein a granulated lead oxide is used as a solid-phase oxidation agent.

18. The mass transfer apparatus according to claim 5, wherein the openings are made in the form of a series of slits having a width lesser than a size of particles of a solid-phase oxidation agent.

19. The mass transfer apparatus according to claim 1, characterized in that it is located horizontally in the oxidizable material reservoir.

* * * * *